US007313659B2

(12) United States Patent
Suzuki (10) Patent No.: US 7,313,659 B2
(45) Date of Patent: *Dec. 25, 2007

(54) SYSTEM AND METHOD FOR MANAGING STORAGE AND PROGRAM FOR THE SAME FOR EXECUTING AN OPERATION PROCEDURE FOR THE STORAGE ACCORDING TO AN OPERATION RULE

(75) Inventor: Masao Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/524,483

(22) Filed: Sep. 21, 2006

(65) Prior Publication Data

US 2007/0016750 A1 Jan. 18, 2007

Related U.S. Application Data

(63) Continuation of application No. 10/649,705, filed on Aug. 28, 2003, now Pat. No. 7,159,081.

(30) Foreign Application Priority Data

Jan. 24, 2003 (JP) .............................. 2003-015521

(51) Int. Cl.
G06F 12/00 (2006.01)
(52) U.S. Cl. ...................................... 711/154; 711/111
(58) Field of Classification Search ................ 711/111, 711/112.1, 14, 161.162; 709/224–226
See application file for complete search history.

(56) References Cited

U.S. PATENT DOCUMENTS

| 6,542,972 | B2 | 4/2003 | Ignatius et al. ............. 711/154 |
| 6,625,623 | B1 | 9/2003 | Midgley et al. ............. 707/204 |
| 6,912,627 | B2 | 6/2005 | Matsunami et al. ........ 711/154 |
| 2002/0133669 | A1 | 9/2002 | Devireddy et al. ......... 711/114 |
| 2003/0061491 | A1 | 3/2003 | Jaskiewcz et al. |
| 2003/0115204 | A1 | 6/2003 | Greenbatt et al. |
| 2003/0135609 | A1 | 7/2003 | Carlson et al. |
| 2003/0172239 | A1 | 9/2003 | Swank ........................ 711/163 |
| 2004/0030826 | A1 | 2/2004 | Knapp ......................... 711/112 |
| 2004/0054782 | A1* | 3/2004 | Donze et al. ................ 709/227 |
| 2004/0059808 | A1 | 3/2004 | Galloway et al. ........... 709/224 |
| 2004/0123062 | A1 | 6/2004 | Dalal et al. ................. 711/170 |

(Continued)

FOREIGN PATENT DOCUMENTS

JP 05173873 7/1993

(Continued)

Primary Examiner—Woo H. Choi
(74) Attorney, Agent, or Firm—Mattingly, Stanger, Malur & Brundidge, P.C.

(57) ABSTRACT

A method for managing storage devices provides a function of automatically changing a scenario and automatically making a partial change to the scenario according to a change in the environment, which are made possible by executing an operation procedure according to an operation rule for storage devices and feeding back a result of execution of the scenario. A storage managing server contains a policy definition file, a scenario definition file, a priority definition file, an execution result value file, a feedback definition file, and a scenario parameter definition file, and also obtains performance information and executes scenarios. By using all those files and processes, the storage managing server implements automatic management of a policy-based storage system.

2 Claims, 7 Drawing Sheets

U.S. PATENT DOCUMENTS

2004/0139451 A1* 7/2004 Hope et al. .................. 719/318
2004/0158676 A1 8/2004 Kasmirsky et al.
2004/0177228 A1 9/2004 Leonhardt et al.
2004/0243699 A1 12/2004 Koclanes et al.

FOREIGN PATENT DOCUMENTS

JP        2001142648    5/2001
JP        20047304      1/2002

* cited by examiner

EXAMPLE OF POLICY DEFINITION FILE

| No. | POLICY |
|---|---|
| 1 | CREATE QUICK BACKUP COPY |
| 2 | CREATE BACKUP COPY AT LOW COST |
| 3 | CREATE BACKUP COPY WITH LOW LOAD |
| | . . . . . . |

FIG. 4

EXAMPLE OF SCENARIO DEFINITION FILE

| No. | SCENARIO |
|---|---|
| 1 | STORE BACKUP COPY ON TAPE A |
| 2 | STORE BACKUP COPY ON TAPE B |
| 3 | STORE BACKUP COPY ON TAPE C |
| 4 | STORE BACKUP COPY IN STORAGE A |
| 5 | STORE BACKUP COPY IN STORAGE B |
| | . . . . . . |

FIG. 5

PRIORITY DEFINITION FILE

| POLICY NO. | SCENARIO PRIORITY (IN ORDER OF SCENARIO NOS.) |
|---|---|
| 1 | 4 - 5 - 3 - 2 - 1 |
| 2 | 1 - 2 - 3 - 5 - 4 |
| 3 | 3 - 1 - 4 - 5 - 2 |
| | . . . . . . |

FIG. 6

EXAMPLES OF EXECUTION RESULT

| EXECUTION RESULT ITEMS | RESULTS |
|---|---|
| BACKUP TIME ON TAPE A | 50 min |
| BACKUP TIME ON TAPE B | 40 min |
| BACKUP TIME ON TAPE C | 30 min |
| BACKUP TIME ON STORAGE B | 5 min |
| BACKUP TIME ON STORAGE A | 21 min |
| . . . . . . | . . . . . . |

FIG. 7

EXAMPLES OF FEEDBACK DEFINITION FILE

| CONDITION | FEEDBACK PROCESS |
|---|---|
| BACKUP TIME OVER 50 min | RAISE SCENARIO PRIORITY 3 LEVELS |
| BACKUP TIME OVER 30 min | RAISE SCENARIO PRIORITY 2 LEVELS |
| BACKUP TIME OVER 20 min | RAISE SCENARIO PRIORITY 1 LEVELS |
| . . . . . . | . . . . . . |

FIG. 8

EXAMPLES OF SCENARIO PARAMETER DEFINITION FILE

| CONDITION | FEEDBACK PROCESS |
|---|---|
| FC-SW UTILIZATION OVER 60% | CHANGE FC-SW PATH |
| FAULT OCCURRED IN FC-SW PORT | CHANGE FC-SW PATH |
| DISK FREE AREA UNDER 20% | APPEND DISK STORAGE |
| . . . . . . | . . . . . . |

SYSTEM AND METHOD FOR MANAGING STORAGE AND PROGRAM FOR THE SAME FOR EXECUTING AN OPERATION PROCEDURE FOR THE STORAGE ACCORDING TO AN OPERATION RULE

The present application is a continuation of application Ser. No. 10/649,705, filed Aug. 28, 2003, now U.S. Pat. No. 7,159,081, the contents of which are incorporated herein by reference.

BACKGROUND OF THE INVENTION

The present invention relates to a system and a method for managing storage devices, and also relates to a program for the same.

In recent years, with the progressive increase of databases in business firms, the demand has increased for storage devices, and as a result, the demand has also increased for systems for managing storage devices.

Among systems for managing storage devices, there has been one which obtains information about a file or a volume as managing objects, and also about operation timing, data destination or the like from the servers or storage, and according obtained information, gives the storage devices an instruction to perform a process on the file or the volume based on the information, such as operation timing (as disclosed in JP-A-2002-7304, for example).

In the above-mentioned storage-device management system, automatic management can be implemented such that, on receiving an instruction to perform a process on data stored in the integrated storage system or responding to a request regarding the data, voluntarily issued by a SAN Management Device, this management system obtains information necessary to process that data, and according this information, decides an execution schedule of function software for the starting procedure or timing of various kinds of function software (software to create replica, copy data, separate replica, create backup copy or remote copy, etc.) residing in the storage, network switches, servers or the like, actually starts the function software according to the decided execution schedule, obtains execution results from the function software of the respective devices, and reports the results to the application that requested data processing.

However, no method has been clearly disclosed to automatically change the operation procedure when there is a change in the environment of the storage system or load on the storage system or to change the operation procedure by feeding back execution results.

SUMMARY OF THE INVENTION

The present invention has as its object to provide a function to execute an operation procedure of storage devices according to an operation rule (hereafter referred to as a policy) for the storage devices, and feed back a result of execution to thereby automatically change a scenario or automatically make a partial change to the scenario according to a change of the environment.

A method for managing storage devices by using a computer, wherein the computer reads information about an operation rule for the storage devices accommodated previously in a memory device and information about an operation procedure of the storage devices associated with the operation rule for the storage devices, receives an instruction to select the information about the operation rule for the storage devices from a user, and sends the storage devices an instruction to execute the operation procedure of the storage devices associated with information about the operation rule on the basis of the operation rule received.

Other objects, features and advantages of the invention will become apparent from the following description of the embodiments of the invention taken in conjunction with the accompanying drawings.

DETAILED DESCRIPTION OF THE EMBODIMENTS

Preferred embodiments of the present invention will be described in detail by referring to the drawings.

Figure 1:
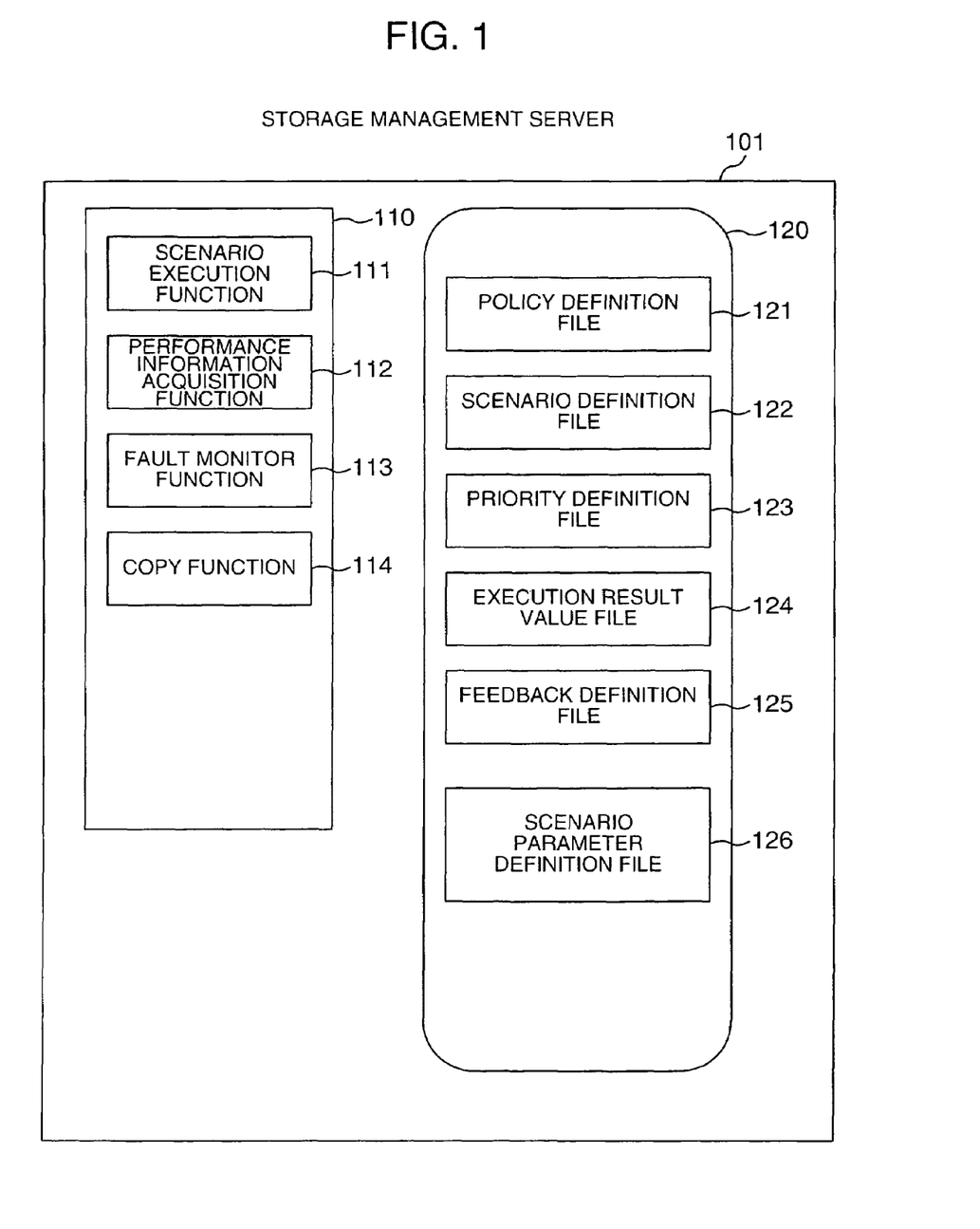
FIG. 1 is a diagram showing a schematic structure of a server for managing the operation of storage according to the present invention.

FIG. 1 is a diagram showing a schematic structure of a server for managing the operation of storage according to the present invention. The server for managing the operation of storage 101 includes a scenario execution function 111, a performance information obtaining function 112, a fault monitor function 113, a copy function 114, a policy definition file (a file defining an operation rule for storage devices) 121, a scenario definition file (a file defining the operation procedure or the operation of the storage devices) 122, a priority definition file 123, an execution result value file 124, a feedback definition file 125, and a scenario parameter definition file 126. The scenario execution function 111 executes scenarios of the scenario definition file 122 generated based on the policy definition file 121.

The performance information obtaining function 112 is used to obtain information about the utilization rate of the I/O port of the storage devices and fiber channel switches (FC-SWs) or information about free areas of the disks. The fault monitor function 113 watches out for a fault in the FC-SWs, the operation server, the storage devices, and so on by using a general protocol, such as SNMP. The copy function 114 generates backup files and restores programs or data used for backup.

The priority definition file 123 defines a basis on which the scenario execution function 111 decides an execution priority of a plurality of scenarios in the scenario definition file 122, which are generated based on the policy in the policy definition file 121. The execution result value file 124 stores the results of execution of scenarios. The feedback definition file 125 defines the priority of scenarios to be executed on the basis of execution result of a scenario. The scenario parameter definition file 126 stores the definition of changes in parameters of some of the scenarios to be executed.

Figure 2:
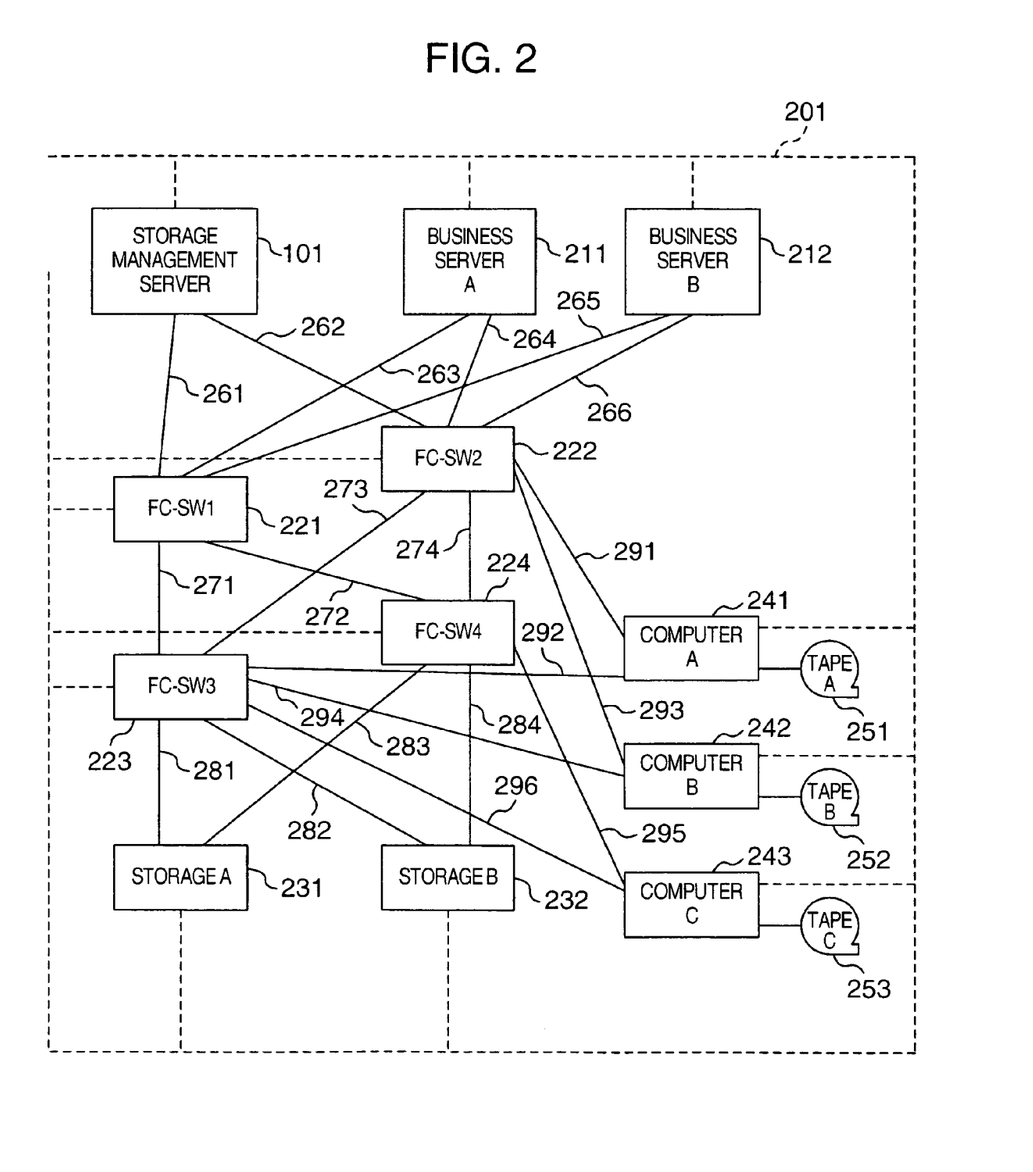
FIG. 2 is a diagram showing an example of a storage network system as a target of storage operation management according to the present invention.

FIG. 2 is a diagram showing an example of a storage network system as a target of storage operation management according to the present invention. In this system, a SAN network is configured by business servers 211, 212, FC-SWs 221, 222, 223, 224, disk units (storages) 231, 232, computers 241, 242, 243 with tape devices 251, 252, 253, and a storage management server 101.

The business servers 211, 212 and the storage management server 101 are interconnected with FC-SWs 221, 222 and fiber channels 261-266. Likewise, FC-SWs 221, 222, 223, 224 are interconnected with fiber channels 271-274. The disk units 231, 232 and FC-SWs 223, 224 are interconnected with fiber channels 281-284.

The computers 241, 242, 243 with tape devices are also interconnected with FC-SWs 222, 223, 224 and fiber channels 291-296. Those devices are connected on a network indicated by dotted lines 201. The protocol used in this network is TCP/IP.

This TCP/IP network 201 is provided in order to perform configuration of each device and detect faults in the devices. To take an example, for the FC-SWs, telnet commands are provided which are defined so that the FC-SWs are controlled by Telnet. (In other words, it is possible to log into an FC-SW from a computer by using a telnet command and control the FC-SW in which one has logged.)

Also for the business servers, there are provided telnet commands controlled by Telnet, making it possible to control the operation of the storage devices in processes, such as creating a backup copy of a database currently used. In this preferred embodiment, the management of storages is automated by using this TCP/IP network 201.

Figure 3:
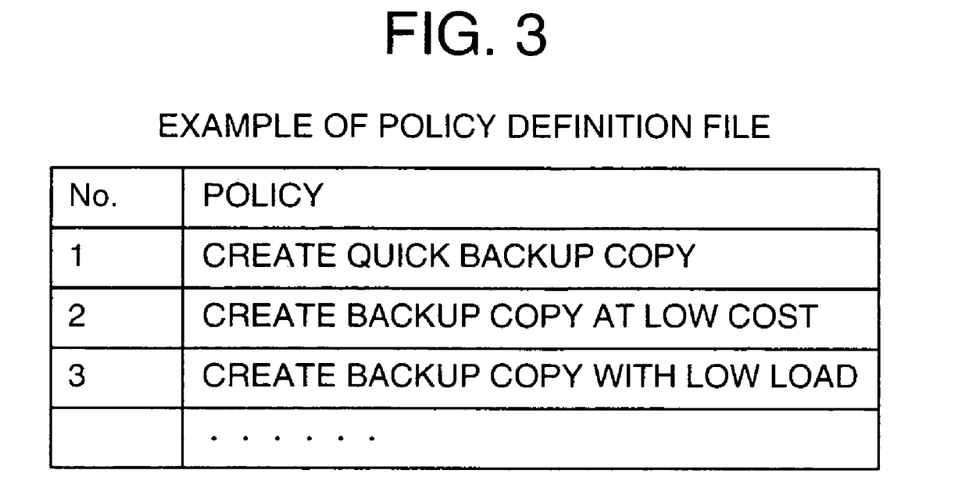
FIG. 3 is a diagram showing the structure of a policy definition file.

FIG. 3 shows an example of a policy definition file. Policies are definitions that provide clear descriptions of the conceptual storage management criteria. The policies include "Create a backup copy as quickly as possible", "Create a backup copy at low cost", or "Create a backup copy with low load applied to the SAN network". In the example of FIG. 3, to discriminate among multiple policies, identifiers are assigned to respective policies. For example, the policy associated with identifier 1 is to "Create a backup copy as quickly as possible." The policy associated with identifier 2 is to "Create a backup copy at low cost." The policy associated with identifier 3 is to "Create a backup copy with low load."

Figure 4:
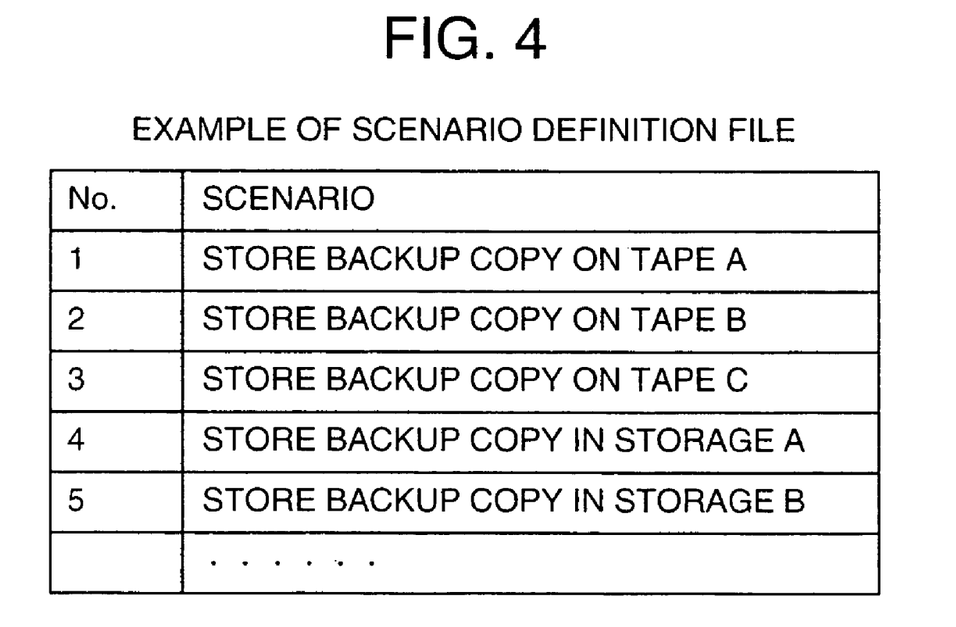
FIG. 4 is a diagram showing the structure of a scenario definition file.

FIG. 4 shows an example of a scenario definition file.

In the example of FIG. 4, an identifier is assigned to each of a plurality of scenarios. For example, a scenario associated with identifier 1 is to "Store a backup copy on tape A."

Scenarios are a procedure of actions defined to realize the contents of the policy definition file. A plurality of scenarios may be defined for one policy. Or, a scenario may be shared by a plurality of policies. A concrete example is to "Create a backup copy of data stored in a database being used by the business server B and store in the tape device A as a backup device by using a backup command X."

The scenario parameters mentioned earlier are the devices defined in the scenarios, control of those devices, and so on. For example, when the scenario to "Store a backup copy on tape A" associated with the identifier 1 in FIG. 4 is changed, a backup device may be changed in such a manner as to "Store a backup copy on hard disk B", or instead of changing the backup device, a backup method may be changed, or a change can be made in any other way.

Figure 5:
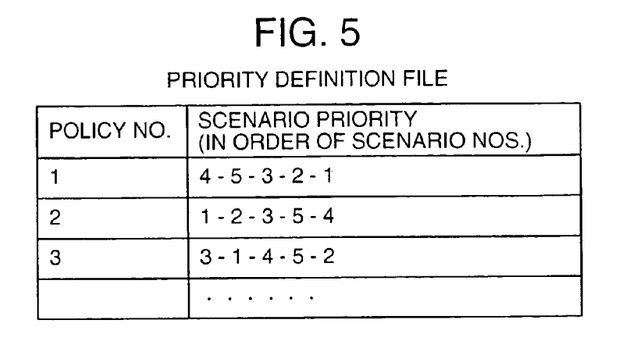
FIG. 5 is a diagram showing the structure of a priority definition file.

FIG. 5 shows a structure of a priority definition file, in other words, indicates the priority of scenarios defined in each policy. For example, when creating backup copies of the same database, a different backup method can be used by applying a different account unit price or the backup method can be changed depending on different times until a backup copy is completed. In FIG. 5, the scenario numbers (scenario identifiers) of FIG. 4 are arranged in the order of priority for each of the policy numbers of FIG. 3.

In the example of FIG. 5, with regard to the policy No. 1 of "Create a quick backup copy", the scenarios (actions) are defined in the order of faster execution time in creating a backup copy of the same data—"Store a backup copy in storage A", "Store a backup copy in storage B", "Store a backup copy on tape C", "Store a backup copy on tape B", and "Store a backup copy on tape A". In the same way, with regard to the policy No. 2 of "Create a backup copy at low cost", the scenarios are defined in their order of lower account unit price. As the scenario to be executed first, a scenario of lowest priority, namely, of a scenario number lastly defined in the row of scenario priority is set.

Figure 6:
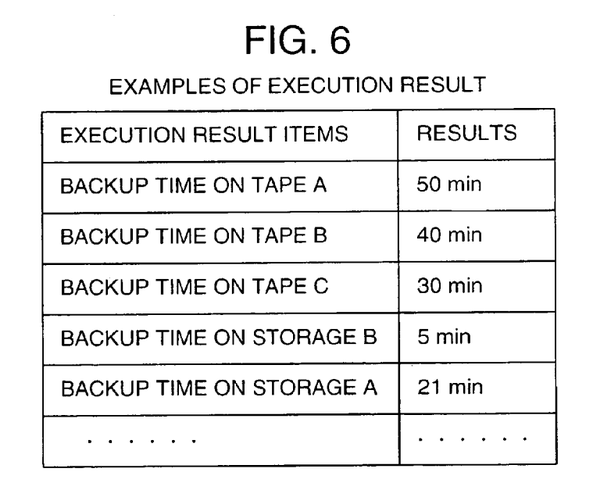
FIG. 6 is a diagram showing the structure of an execution result file.

FIG. 6 shows the structure of an execution result file, which stores the scenarios executed and results obtained. For example, a backup time of 50 min is shown as a result when a backup copy was stored on the tape device A.

Figure 7:
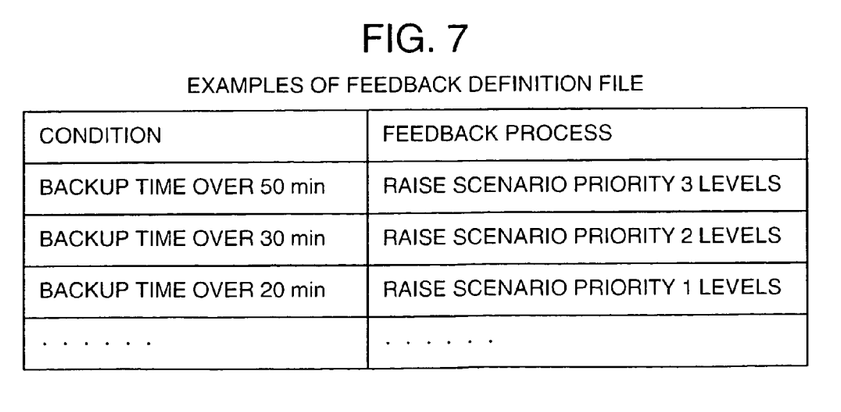
FIG. 7 is a diagram showing the structure of a feedback definition file.

FIG. 7 shows the structure of a scenario parameter file, which defines the conditions for changing priority for scenarios to be executed as well as changes made to the scenarios executed, on the basis of results of the execution of the scenarios. As an example, a feedback process that "when the backup time is longer than 50 min, the priority of the scenarios is raised three levels" is cited. Thus, time for next backup is shortened.

Figure 8:
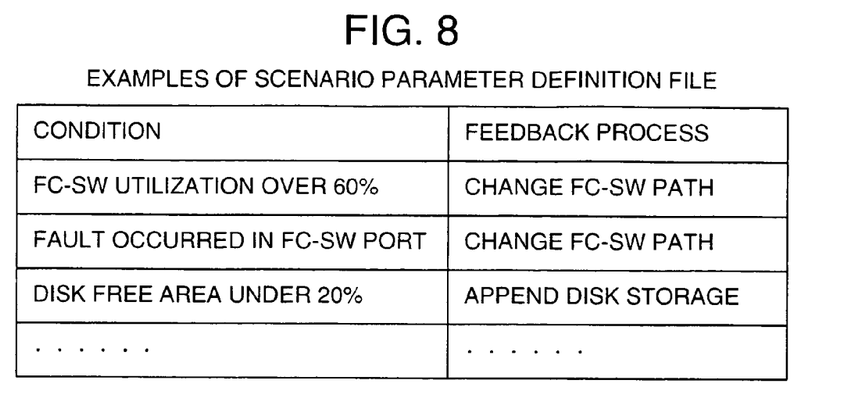
FIG. 8 is a diagram showing the structure of a scenario parameter definition file.

FIG. 8 shows the structure of a scenario parameter definition file, which describes the conditions to be checked just before the execution of scenarios and also describes changes made to the parameters of the scenarios executed. For example, "When the utilization rate of a FC-SW port is higher than 60%, change the path of the FC-SW." is cited. By this change of the parameter, the load on the storage network is dispersed.

Figure 9:
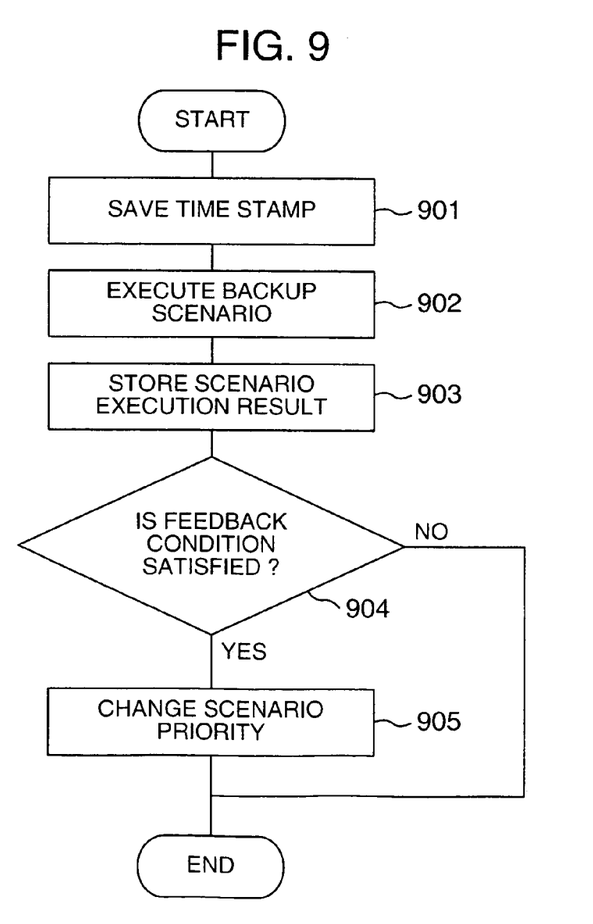
FIG. 9 is a diagram showing an example of a method for feeding back a scenario execution result.
Figure 10:
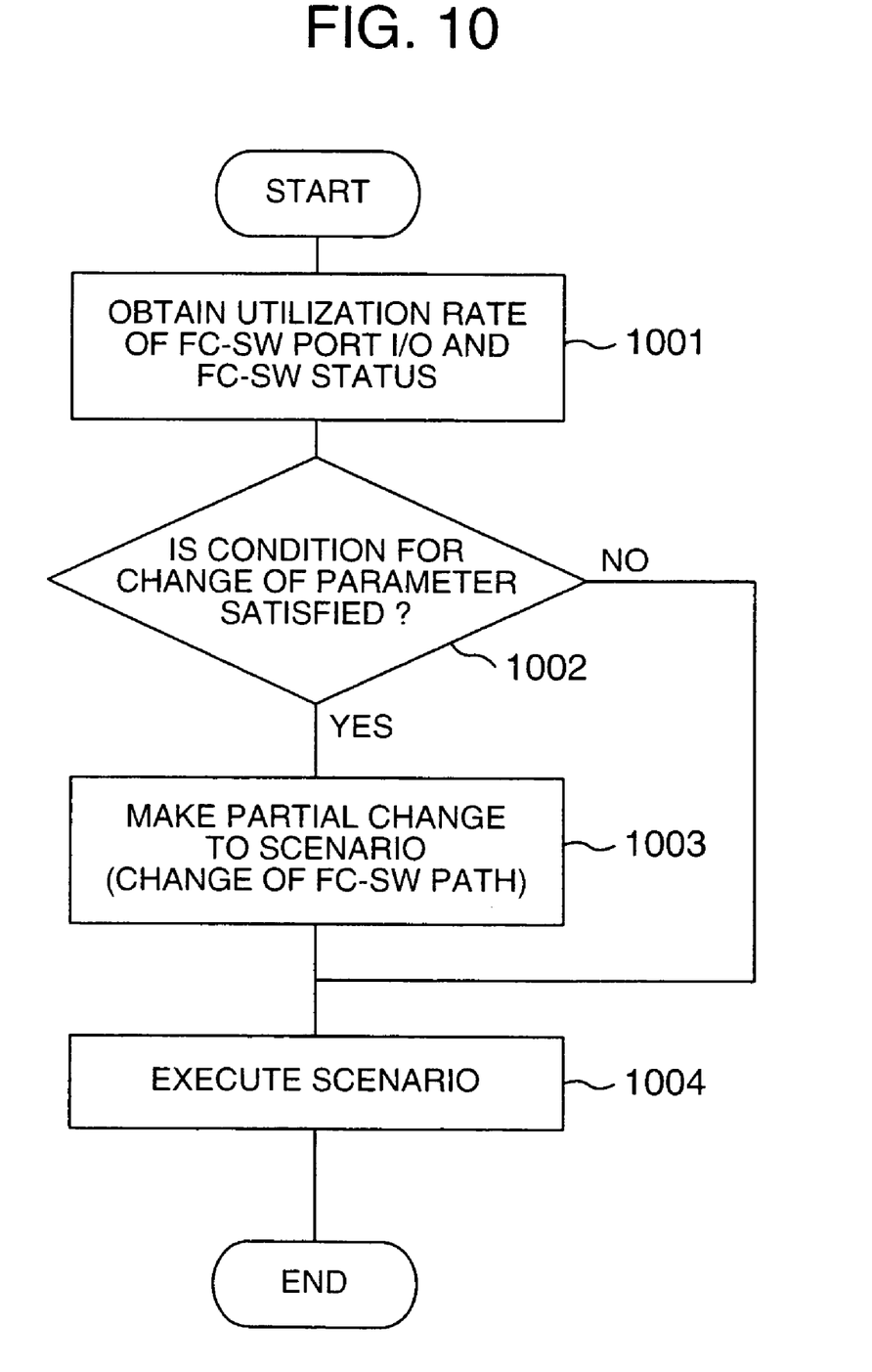
FIG. 10 is a diagram showing an example of a method for partially changing a scenario parameter.

FIGS. 9 and 10 show examples of methods of using scenarios in management of the storage by using definition files in FIGS. 3 to 8.

FIG. 9 shows an execution procedure by which the storage management server to execute the policy of creating a backup copy of the database of a business server. At step 901, the time stamp before backup is saved. At step 902, a backup scenario "Store a backup copy in Storage A" is executed. When the backup scenario is finished, a scenario execution result is stored at step 903. Here, the time stamp is saved again, and from a difference from the time stamp saved at step 901, a backup time is obtained.

Here, let us suppose that the backup time is 21 min. At step 904, this 21 min is compared with a condition that "Backup time is longer than 20 min in the feedback definition file" and it is understood that the 21 min satisfies the condition; therefore, priority is raised one level to "Store a backup copy in storage B", which is executed next.

FIG. 10 shows a procedure of the execution of a policy that the storage management server stores a backup copy of the database of the disk device 231 of the business server 211 into a tape device 253. As database backup paths, a path from the disk device 231 through the fiber channel 281, FC-SW 223 and the fiber channel 296 and a path from the disk device 231 through the fiber channel 283, FC-SW 224 and the fiber channel 295 are defined in advance in the storage management server 101. Normally, the former path is used for backup.

At step 1001, the utilization rate of the I/O port of the FC-SW 281 is obtained and let use suppose that the utilization rate is 65% or that the status of the FC-SW port is "at fault". The obtained status of the FC-SW port is notified from the FC-SW to the fault monitor function 113 by using SNMP.

At step 1002, the above-mentioned 65% is compared with a condition that "the utilization rate of the FC-SW port is higher than 60%" in the scenario parameter definition file and it is understood that the 65% satisfies the condition; therefore, at step 1003, a partial change of scenario, e.g., "Change the FC-SW path" to the latter path" is carried out, and at step 1004, a scenario to back up a database is executed.

Incidentally, with regard to information about the utilization state of the storage devices, their performance and load, fault monitoring, etc., it is possible to arrange for the storage management server to make inquiries to the devices to collect information, or the storage management server may ask the devices for information by taking an opportunity of receiving an instruction to execute a policy from a user, or information may be obtained by some other method.

As to which parameters of scenarios to change based on information collected, some procedures may be defined beforehand in the storage management server, or parameters to be changed may be decided according to kinds of information collected or predetermined threshold values, or the scenarios may be changed or their priorities may be changed by some other methods.

As described above, by changing the scenarios based on information collected, it becomes possible to respond flexibly to changes that may occur in the system.

Figure 11A:
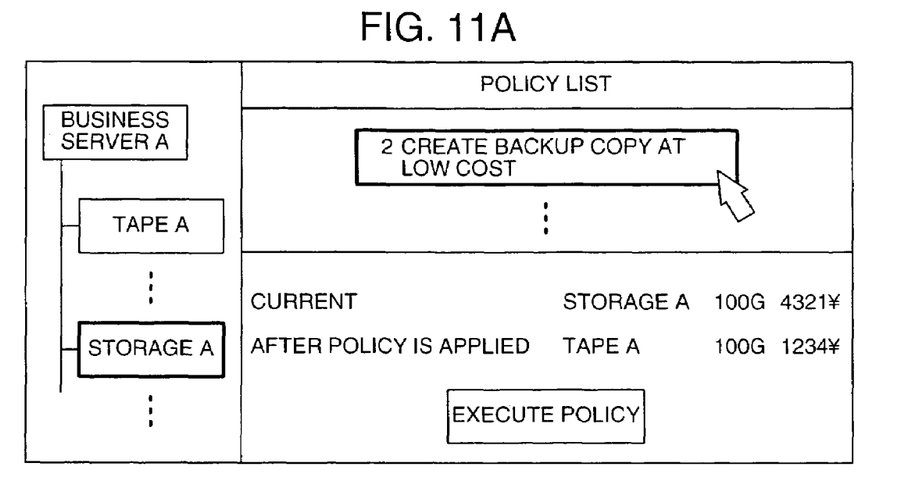
FIGS. 11A and 11B are diagrams showing examples of screen display.
Figure 11B:
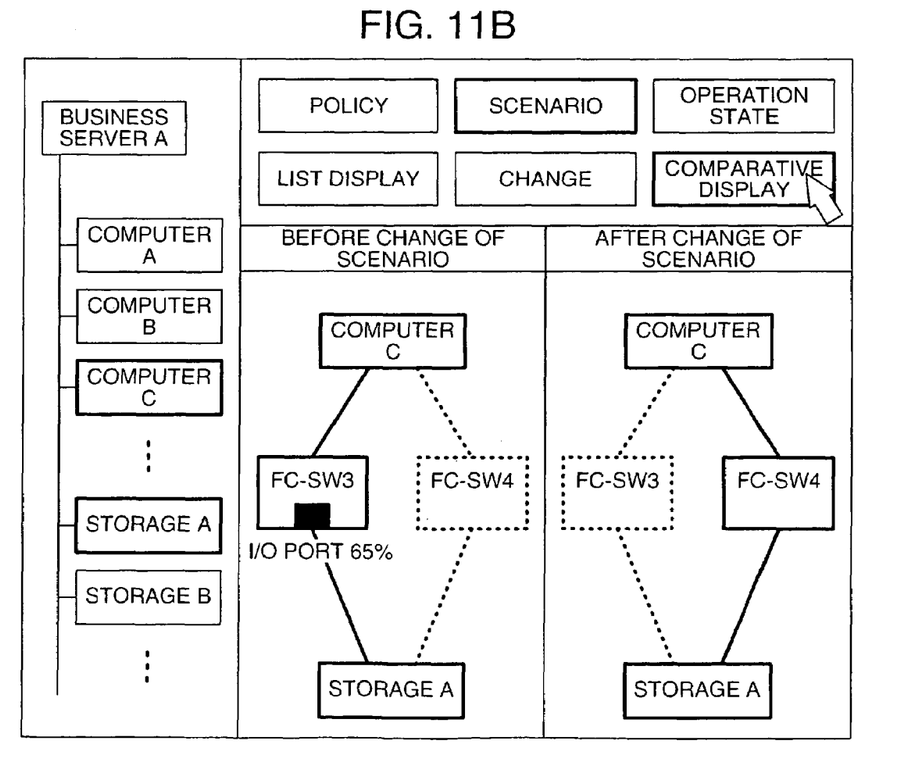

Referring to FIGS. 11A and 11B, description will be made of an example of screen display on which the user sets policies, and another example of scenario display. Those screen images may be provided from the storage management server, and may be displayed using a Web browser on a computer which is accessible to the storage management server. The screen images may be provided by any other method.

As shown in FIG. 11A, in the left field of the window, the objects (computers, storage devices, FC-SWs, etc.) of the storage management server are shown in a tree form. When a user selects a storage device with a mouse pointer, for example, a list of policy definitions for the selected storage device is presented in the upper right field of the window. The information that associates the storage devices with the policies for the storage device may be stored in advance in the storage management server or in some other means.

The user selects a policy from among the policies shown at the upper right field by using a mouse pointer, for example. The lower right field shows what changes will occur from the current operation of the storage device when the policy selected by the user is applied. Therefore, it is possible for the user to previously compare the current state of operation of the storage devices with that after the selected policy is applied, and decide whether to apply that policy. The example shown in FIG. 11A presents costs of storage before and after the policy is applied, but may present any other data.

As in the example of FIG. 11B, the screen may show the situation before and after the scenario is changed. When displaying a change of some scenario parameter and the resulting states of the storage devices, information about the states of the scenario parameters may be displayed so that the user may grasp the states of the related storage devices.

The flowchart in FIG. 10 will be described as an example. As database backup paths, a path involving the disk device 231—the fiber channel 281—FC-SW 223—the fiber channel 296 and a path involving the disk device 231—the fiber channel 283—FC-SW 224—the fiber channel 295 are defined in advance. Suppose that the utilization rate of the I/O port of FC-SW 281 was obtained and turned out to be 65%. If this utilization rate is compared with a condition "the utilization rate of FC-SW I/O port is higher than 60%" in the scenario parameter definition file, it is understood that the 65% satisfies the condition. Therefore, a partial change of scenario, e.g., "Change the FC-SW path to the latter path" is carried out. The paths before and after the change of scenario in an example of this case are shown in the lower right field of the window in FIG. 11B.

In the left field of the window in FIG. 11B, the managing objects (computers, storage devices, FC-SW, etc.) of the storage management server are shown in a tree form. A menu of objects displayed by the user is shown in the upper right field of the window. Here, this example shows that comparative display of scenario is selected by a user with a mouse pointer. In the lower right field of the window, the states before and after the selected scenario is changed are shown. In this example, the value of "port utilization rate" as a key to change the scenario is displayed on the screen, and the paths before and after the change are illustrated. Some other data may be displayed.

As has been described in detail, according to the present invention, it is possible to enable actions to be taken automatically, such as executing an operational procedure (scenarios) of the storage devices according to the storage operation rule (policy), automatically changing scenarios by feeding back information about execution results and the state of utilization and information about fault monitoring, or making a partial change to the operation rules according to the changing environments.

Further, when putting a policy into practical application, it is possible to display the states before and after each policy is applied as a guidepost, from which the user can decide which policy to choose.

When the states before and after the change of a scenario are displayed, the states of the scenario parameters and the storage devices may be displayed, so that the user can recognize the state of utilization of each storage device.

As has been discussed at length, according to the present invention, it is possible to execute an operation procedure (scenarios) according to a storage operation rule (policy), change the scenarios by feeding back execution results, and make partial changes to the operation procedure according to changes in the environment.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for managing storage devices by using a computer, wherein said computer reads information about an operation rule for said storage devices accommodated previously in a memory device and information about an operation procedure being an order of execution of a plurality of operations of said storage devices associated with said operation rule for said storage devices,     wherein said operation rule defines for said operation procedure a predetermined action to be taken if a present condition is not satisfied upon execution of said operation procedure, and     wherein said computer receives an instruction to select said information about said operation rule for said storage devices from an user, sends said storage devices an instruction to execute said operation procedure of said storage devices associated with information about said operation rule based on said operation rule received, obtains a result of virtually executing said operation procedure by simulating said operation procedure, and changes the operation procedure to display on a screen the changed operation procedure compared with the operation procedure if the execution result indicates the present condition has not been satisfied.

2. A method of operational support for storage devices by using a computer, wherein said computer reads in about an operation rule for said storage devices accommodated previously in a memory device and information about an operation procedure being an order of execution of a plurality of operations of said storage device associated with said operation rule for said storage devices,     wherein said operation rule defines for said operation procedure a predetermined action to be taken if a present condition is not satisfied upon execution of said operation procedure, and     wherein said computer obtains information of a result of virtually executing an operation by said storage devices from said storage devices by simulating said operation procedure, and based on said information obtained from said storage devices, changes the operation procedure to display on a screen the changed operation procedure compared with the operation procedure if the execution result indicates the present condition has not been satisfied.

\* \* \* \* \*